United States Patent [19]
Kim

[11] Patent Number: 5,857,033
[45] Date of Patent: Jan. 5, 1999

[54] METHOD FOR IMAGE ENHANCING USING QUANTIZED MEAN-SEPARATE HISTOGRAM EQUALIZATION AND A CIRCUIT THEREFOR

[75] Inventor: Young-taek Kim, Suwon, Rep. of Korea

[73] Assignee: Samsung Electronics Co., Ltd., Kyungki-do, Rep. of Korea

[21] Appl. No.: 813,045

[22] Filed: Mar. 7, 1997

[30] Foreign Application Priority Data

Mar. 9, 1996 [KR] Rep. of Korea ............. 1996-6220

[51] Int. Cl.$^6$ .................................................. G06K 9/00
[52] U.S. Cl. ........................................ 382/168; 382/254
[58] Field of Search .................................. 250/369, 371, 250/363.02, 370.1; 348/672, 678; 382/159, 167, 168, 169, 170, 171, 172, 173, 181, 224, 232, 239, 251, 252, 253, 254, 266, 270, 271, 272, 273, 274, 275, 307

[56] References Cited

U.S. PATENT DOCUMENTS 4,353,092  10/1982  Bailey et al. ............................ 358/160
5,489,782  2/1996   Wernikoff ................................ 250/369

FOREIGN PATENT DOCUMENTS 0 383 269    8/1990  European Pat. Off. ........ G06F 15/68
0 603 980 A2 6/1994  European Pat. Off. ......... H04N 1/40
2 281 674    3/1995  United Kingdom .............. G06T 5/40

*Primary Examiner*—Leo H. Boudreau
*Assistant Examiner*—Bijan Tadayon
*Attorney, Agent, or Firm*—Sughrue, Mion, Zinn, Macpeak & Seas, PLLC

[57] ABSTRACT

A histogram equalization method for enhancing an image is provided and includes the steps of: quantizing the level of input image signals; quantizing a mean level of quantized input image signals by a unit of a picture; splitting quantized input image signals into a predetermined number of quantized sub-images according to a quantized mean level; calculating a cumulative density function value of each quantized sub-image; interpolating the cumulative density function value of each sub-image according to input image signals and the cumulative density function value of each quantized sub-image; and independently histogram-equalizing each quantized sub-image according to the interpolated cumulative density function value of each quantized sub-image, to thereby enhance the contrast and preserve the overall brightness of a given image as well as simplify the circuit hardware.

14 Claims, 2 Drawing Sheets

METHOD FOR IMAGE ENHANCING USING QUANTIZED MEAN-SEPARATE HISTOGRAM EQUALIZATION AND A CIRCUIT THEREFOR

BACKGROUND OF THE INVENTION

The present invention relates to a method for enhancing an image using quantized mean-separate histogram equalization (MSHE) and a circuit therefor, and more particularly, to a method and a circuit for implementing the method, in which the input image signals are quantized and split into a predetermined number of sub-images, and then each sub-image is independently histogram-equalized.

The histogram of gray levels completely describes the appearance of an image. Properly adjusting the gray levels for a given image enhances the appearance or the contrast of the image.

Among the various types of methods used for enhancing the contrast of an image, histogram-equalization, which enhances the contrast of a given image according to the sample distribution of the image is most widely known and disclosed in the following documents: [1] J. S. Lim, "Two-Dimensional Signal and Image Processing", Prentice Hall, Englewood Cliffs, N.J., 1990; and [2] R. C. Gonzales and P. Wints, "Digital Image Processing", Addition-Wesley, Reading, Mass., 1977.

In addition, useful applications of the histogram-equalization method, including medical image processing and a radar image processing, are disclosed in the following documents: [3] J. Zimmerman, S. Pizer, E. Staab, E. Perry, W. McCartney and B. Breton, "Evaluation of the Effectiveness of Adaptive Histogram Equalization for Contrast Enhancement," IEEE Tr. on Medical Imaging, pp. 304–312, Dec. 1988; and [4] Y. Li, W. Wang and D. Y. Yu, "Application of Adaptive Histogram Equalization to X-ray Chest Image," Proc. of the SPIE, pp. 513–514, vol. 2321, 1994.

Generally, since histogram equalization extends through the dynamic range, the distribution density of the resultant image is made uniform. As a result, the contrast of the image is enhanced.

This widely known characteristic of histogram equalization is disadvantageous in some cases. That is, because the output density of the histogram equalization is uniform, the mean brightness of an output image is near the middle of the gray level range.

Actually for the histogram equalization of an analog image, the mean brightness of the output image due to the histogram equalization is the middle gray level regardless of the mean brightness of the input image. This characteristic is undesirable for some applications. For instance, the fact that an image taken in the night looks like an image taken in the daytime after histogram equalization is a problem.

In addition, because the conventional histogram equalizer requires the storage of each gray level number, the cost for hardware is high. For example, if 256 gray levels (L) are used, 256 memory devices are required for storing the occurrence numbers of all levels, and 256 accumulators are required for accumulating every occurrence number of each level.

SUMMARY OF THE INVENTION

To overcome the above problem, it is an object of the present invention to provide a method for image enhancing in which the level of an input image signal is quantized, and split into a predetermined number of sub-images and then each sub-image is independently histogram-equalized, thereby enhancing the contrast.

It is another object of the present invention to provide a circuit for image enhancing which quantizes the level of an input image signal, splits the quantized input image signals into a predetermined number of sub-images, and independently histogram-equalizes each sub-image, thereby reducing the amount of hardware required for image enhancement.

To achieve the above first object, there is provided a method for enhancing the image of histogram-equalizing image signals represented as a predetermined number of gray levels, the method comprising the steps of: (a) quantizing levels of input image signals and outputting quantized input image signals; (b) quantizing the mean of the quantized input image signals by a unit of a picture and outputting a quantized mean level; (c) splitting the quantized input image signals into a predetermined number of quantized sub-images according to the quantized mean level; (d) obtaining a cumulative density function value for each quantized sub-image; (e) interpolating the cumulative density function value of each quantized sub-image based on the input image signals and the cumulative density function value obtained for each quantized sub-image and outputting an interpolated cumulative density function value obtained for each quantized sub-image; and (f) independently performing histogram-equalization for each quantized sub-image according to the interpolated cumulative density function value for each quantized sub-image.

To achieve the above second object there is provided a circuit for enhancing the image of histogram-equalizing image signals represented as a predetermined number of gray levels, the circuit comprising: first quantizing means for quantizing levels of input image signals and outputting quantized input image signals; first calculating means for calculating a gray level distribution of the quantized input image signals by a unit of a picture; second calculating means for calculating the mean level of input image signals by a unit of a picture; second quantizing means for quantizing the mean level and outputting a quantized mean level; third calculating means for calculating a cumulative density function value for each quantized sub-image by splitting the gray level distribution calculated in the first calculating means into a predetermined number of quantized sub-images according to the quantized mean level; interpolating means for interpolating the cumulative density function value of each quantized sub-image based on the input image signals and the cumulative density function value for each quantized sub-image and outputting an interpolated cumulative density function value for each quantized sub-image; mapping means for mapping the sample of each quantized sub-image to a gray level based on the interpolated cumulative density function value for each quantized sub-image; and outputting means for outputting one of the samples mapped to the gray level for each quantized sub-image according to the comparison result of the quantized mean level and the input image signals.

BRIEF DESCRIPTION OF THE DRAWINGS

The above objects and advantages of the present invention will become more apparent by describing in detail a preferred embodiment thereof with reference to the accompanying drawings in which.

DETAILED DESCRIPTION OF THE INVENTION

First of all, the quantized mean-separate histogram equalization (MSHE) method proposed in the present invention will be described.

A given image $\{X\}$ is composed of L discrete gray levels $\{X_0, X_1, \ldots, X_{L-1}\}$. Here, $X_0=0$ represents a black level and $X_{L-1}=1$ represents a white level.

The original discrete input level $\{X_0, X_1, \ldots, X_{L-1}\}$ is quantized to Q discrete levels defined as $\{Z_0, Z_1, \ldots, Z_{Q-1}\}$, where it is assumed that $Z_{Q-1}=X_{L-1}$, $Q_{23}L$ and $\{Z_0, Z_1, \ldots, Z_{Q-1}\} \subset \{X_0, X_1, \ldots, X_{L-1}\}$.

Figure 1:
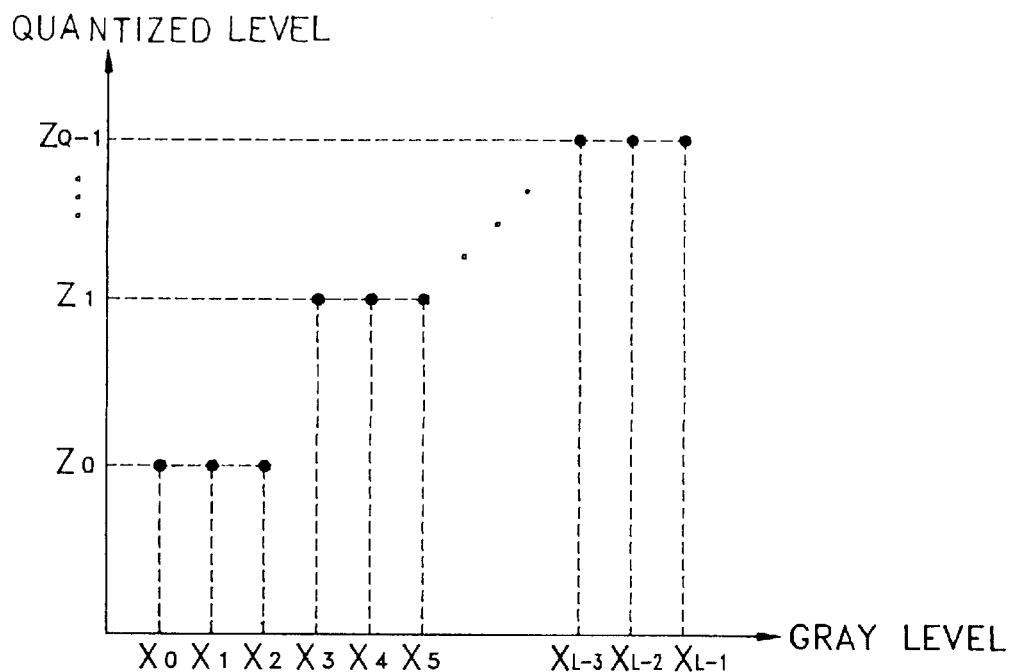
FIG. 1 is a view illustrating an example of quantizing L level discrete signals to Q level discrete signals according to the present invention.

The example in which L level discrete signals are quantized to Q level discrete signals is illustrated in FIG. 1.

$Q[X_k]$ represents a quantizing operation which is defined as follows.

$$Q[X_k]=Z_q,$$

if $Z_{q-1} < X_k \leq Z_q$

Assuming that $\{Z\}=Q[\{X\}]$ and $Z_m=Q[X_m]$, $X_m$ represents the mean level of the original input image, $\{Z\}$ the quantized input image, and $Z_m$ the quantized mean level. The quantized input image $\{Z\}$ is split into two sub-images $\{Z\}_L$ and $\{Z\}_U$ according to $Z_m$. At this stage, all the samples of the quantized sub-image $\{Z\}_L$ are equal to or less than the quantized mean level $Z_m$ and all the samples of the quantized sub-image $\{Z\}_U$ are greater than the quantized mean level $Z_m$.

The quantized probability density function (PDF) of each sub-image $\{Z\}_L$ and $\{Z\}_U$ can be expressed as the following equations (1) and (2).

$$P_L(Z_q) = \frac{N_q^L}{N_L}, \text{ for } Z_q \leq Z_m \quad (1)$$

$$P_U(Z_q) = \frac{N_q^U}{N_U}, \text{ for } Z_q > Z_m \quad (2)$$

Here, $P_L(Z_q)$ is the probability of the q-th gray level $Z_q$ of the quantized sub-image $\{Z\}_L$, $P_U(Z_q)$ is the probability of the q-th gray level $Z_q$ of the quantized sub-image $\{Z\}_U$, $N_q^L$ and $N_q^U$ represent the respective numbers of times that the gray level $Z_q$ appears in quantized sub-images $\{Z\}_L$ and $\{Z\}_U$, respectively, and $N_L$ and $N_U$ represent the total numbers of pixels in the quantized sub-images $\{Z\}_L$ and $\{Z\}_U$, respectively.

Each cumulative density function (CDF) of the quantized sub-images $\{Z\}_L$ and $\{Z\}_U$ is defined as shown by the following equations (3) and (4).

$$C_L(Z_q) = \sum_{j=0}^{q} P_L(Z_j), \text{ for } Z_q \leq Z_m \quad (3)$$

$$C_U(Z_q) = \sum_{j=m+1}^{q} P_U(Z_j), \text{ for } Z_q > Z_m \quad (4)$$

Here, $C_L(Z_m)=1$ and $C_U(Z_{Q-1})=1$.

Figure 2:
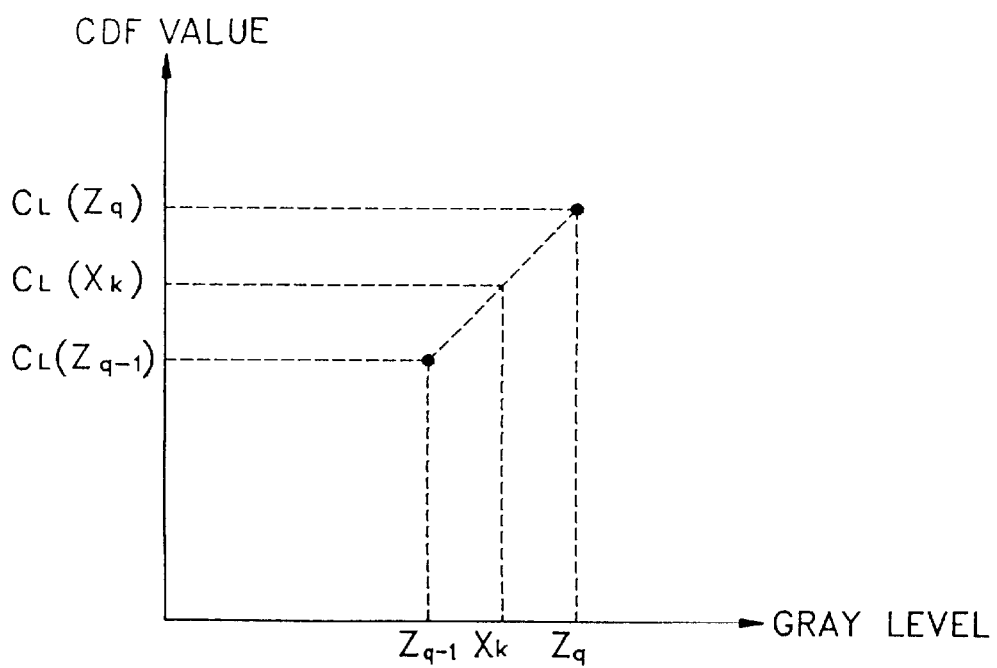
FIG. 2 illustrates the concept of interpolation adopted in the present invention.

Interpolated cumulative density function, $c_L(X_k)$ and $c_U(X_k)$ can be approximately calculated by a linear interpolation from $c_L(Z_q)$ and $c_U(Z_q)$. The linear interpolation is illustrated in FIG. 2.

Assuming that $Q(X_k) = Z_q \leq Z_m$, $Z_{q-1} = 0$ and $C_L(X_k)$ is interpolated as shown by the following equation (5).

$$c_L(X_k) = C_L(Z_{q-1}) + \{C_L(Z_q) - C_L(Z_{q-1})\} \frac{X_k - Z_{q-1}}{Z_q - Z_{q-1}} \quad (5)$$

Similarly, assuming that $Q(X_k) = Z_q > Z_m$, $c_U(X_k)$ is interpolated as shown by the following equation (6).

$$c_U(X_k) = C_U(Z_{q-1}) + \{C_U(Z_q) - C_U(Z_{q-1})\} \frac{X_k - Z_{q-1}}{Z_q - Z_{q-1}} \quad (6)$$

Finally, on the basis of the interpolated cumulative density function, the output Y of the proposed mean-separate histogram equalization (MSHE) with respect to the input image $(X_k)$ is given as the following equation (7).

$$Y = \begin{cases} c_L(X_k)Z_m, & \text{if } X_k \leq Z_m \\ Z_m' + (X_{L-1} - Z_m')c_U(X_k), & \text{if } X_k > Z_m \end{cases} \quad (7)$$

Here $Z_m' = Z_m + X_{L-1}/(L-1)$ which is the next gray level after $Z_m$ at $\{X_0, X_1, \ldots X_{L-1}\}$.

Next, a circuit for enhancing an image using the quantized mean-separate histogram equalization (MSHE) will be described with reference to FIG. 3.

Figure 3:
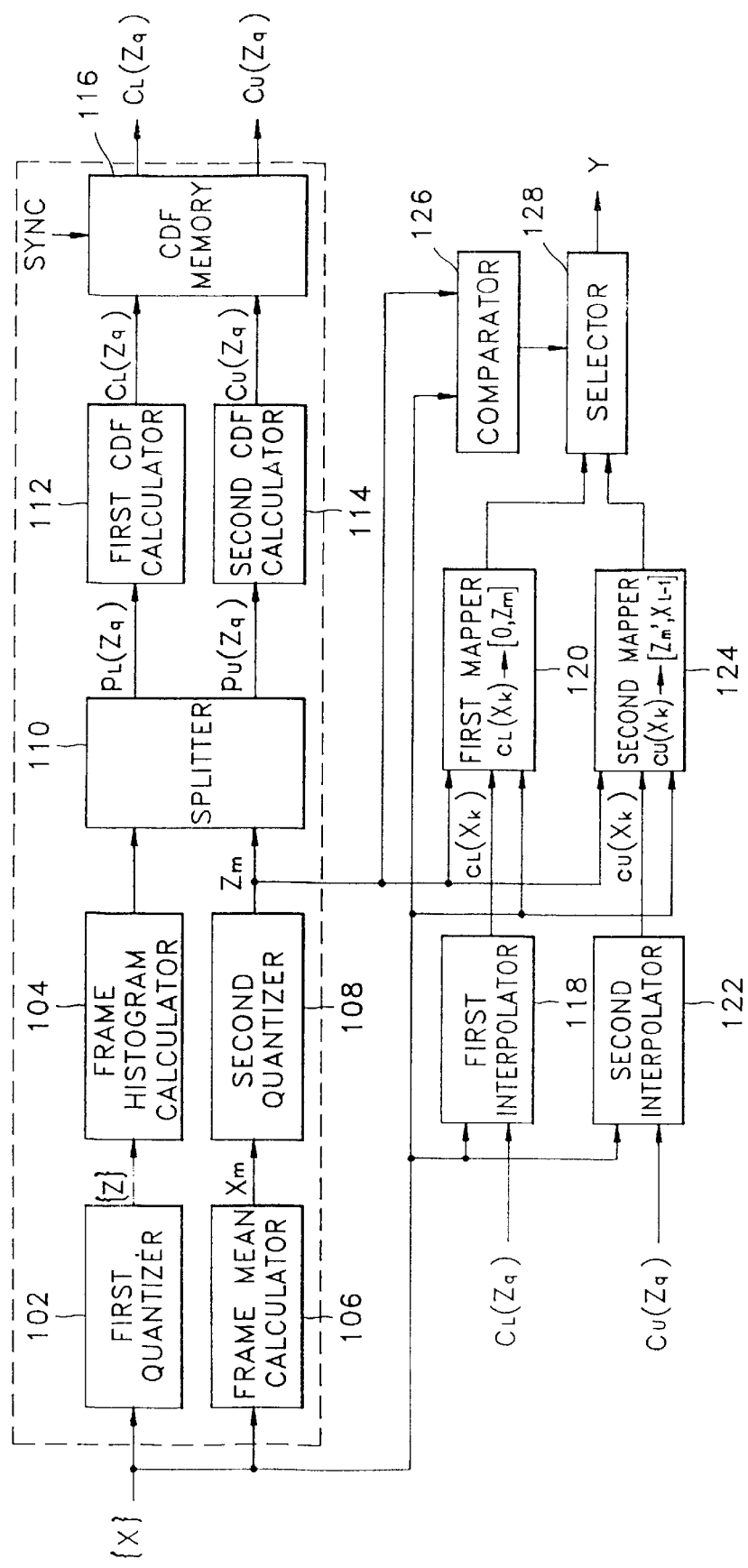
FIG. 3 is a block diagram of a circuit for enhancing image according to an embodiment of the present invention.

FIG. 3 shows the circuit for enhancing image using quantized mean-separate histogram equalization (MSHE).

Referring to FIG. 3, a first quantizer 102 quantizes the input image $\{X\}$ of L discrete levels to Q discrete levels, and outputs the quantized input image $\{Z\}$.

A frame histogram calculator 104 calculates the gray level distribution in a unit of a picture of the quantized input image signal $\{Z\}$. Here the picture unit can be a field, but in this embodiment it is a frame.

A frame mean calculator 106 calculates the mean level $X_m$ of the input image in a unit of a frame.

A second quantizer 108 quantizes the mean level $X_m$ of input image $\{X\}$ and outputs the quantized mean level $Z_m$.

A splitter 110 splits the quantized gray level distribution which is calculated by frame histogram calculator 104 into a predetermined number (2 in this embodiment) of quantized sub-images $\{Z\}_L$ and $\{Z\}_U$ based on the quantized mean level $Z_m$ output from quantizer 108, and outputs each probability density function of the quantized sub-image.

Here the probability density functions $P_L(Z_q)$ and $P_U(Z_q)$ are calculated using the above equations (1) and (2).

Here each sample of quantized sub-image $\{Z\}_L$ is equal to or less than the mean level $Z_m$ and each sample of the quantized sub-image $\{Z\}_U$ is greater than the mean level $Z_m$.

A first cumulative density function (CDF) calculator 112 receives the probability density function (PDF) of the quantized sub-image $\{Z\}_L$ including the quantized image sample being equal to or less than the quantized mean level $Z_m$ and calculates the cumulative density function (CDF) of the quantized sub-image $\{Z\}_L$ using equation (3).

A second cumulative density function (CDF) calculator 114 receives the probability density function (PDF) of the quantized sub-image $\{Z\}_U$ including the quantized image sample being greater than the quantized mean level $Z_m$ and calculates the cumulative density function (CDF) of the quantized sub-image $\{Z\}_U$ using equation (4).

A cumulative density function (CDF) memory 116 updates the cumulative density functions $C_L(Z_q)$ and $C_U(Z_q)$ of the quantized sub-images $\{Z\}_L$ and $\{Z\}_U$ calculated in first and second cumulative density function (CDF) calculators 112 and 114 according to the synchronous signal (SYNC) by the unit of a frame, and provides the prestored cumulative density function (CDF) to first and second interpolators 118 and 122 during the updating.

Here, if the unit of a picture is a field, the synchronous signal is a field synchronous signal, and if it is a frame, the synchronous signal is a frame synchronous signal. Also, the cumulative density function (CDF) memory is used as a buffer.

The first interpolator 118 receives the cumulative density function (CDF) of the quantized sub-image $\{Z\}_L$ and input sample $X_k$, and outputs an interpolated cumulative density function $C_L(X_k)$ which is linearly interpolated using equation (5).

A first mapper 120 receives the interpolated cumulative density function $C_{L\ (Xk)}$, input sample $X_k$, and quantized mean level $Z_m$ and maps the sample of sub-image $\{Z\}_L$ which has a level equal to or less than the quantized mean level $Z_m$ to the gray level of from 0 to $Z_m$ according to the interpolated cumulative density function $C_L(X_k)$.

The second interpolator 122 receives the cumulative density function (CDF) of the quantized sub-image $\{Z\}_U$ and input sample $X_k$, and outputs interpolated cumulative density function $C_U(X_k)$ which is linearly interpolated using equation (6).

A second mapper 124 receives the interpolated cumulative density function $C_U(X_k)$ input sample $X_k$, and quantized mean level $Z_m$ and maps the sample of sub-image $\{Z\}_U$ which has a level greater than the quantized mean level $Z_m$ to the gray level of from $Z_m'$ to $X_{L-1}$ according to the interpolated cumulative density function $C_U(X_k)$. Here $Z_m'=Z_m+X_{L-1}/(L-1)$.

Meanwhile, the input sample $X_k$ applied to first and second interpolators 118 and 122 is the image signal of the next frame to compared cumulative density functions $C_L(Z_q)$ and $C_U(Z_q)$ calculated by first and second CDF calculators 112 and 116.

Therefore, the input sample applied to the first and second interpolators 118 and 122 can be applied after a delay of one frame. Because there is a high correlation between the adjacent frames, the frame memory may be omitted to thereby reduce the quantity of hardware used to enhance the image.

A comparator 126 compares the input sample $X_k$ with the quantized mean level $Z_m$ output from the second quantizer 108, and outputs a selecting control signal which selects the output of the first mapper 120 if the input sample is equal to or less than the quantized mean level $Z_m$, and otherwise selects the output of the second mapper 124.

The selected output, which is the equalized signal Y, is represented by equation (7).

The equalized signal Y enhances the contrast and preserves the entire brightness of the image.

It is possible to apply the present invention to a wide variety of image enhancing devices, such as broadcasting equipment, radar signal processing system, and electronic home appliances as well as medical engineering equipment.

As described above, the method of the present invention effectively reduces artifacts and the abrupt change of brightness generated during a conventional histogram equalization, to thereby enhance the contrast and preserve the overall brightness of the image.

Moreover, the circuit of the present invention stores and accumulates only the number of the quantized levels by quantizing the input image signals, splitting the quantized input image signals into a predetermined number of a sub-image, and independently histogram-equalizing each sub-image. As a result, hardware is simplified and the manufacturing cost is reduced.

What is claimed is:

1. A method for enhancing the image quality of histogram-equalizing image signals represented as a predetermined number of gray levels, said method comprising the steps of:

(a) quantizing levels of input image signals and outputting quantized input image signals;

(b) quantizing a mean of the quantized input image signals by a unit of a picture and outputting a quantized mean level;

(c) splitting the quantized input image signals into a predetermined number of quantized sub-images according to the quantized mean level;

(d) obtaining a cumulative density function value for each of said predetermined number of quantized sub-images;

(e) interpolating the cumulative density function value of each of said predetermined number of quantized sub-images based on the input image signals and the cumulative density function value obtained for each of said predetermined number of quantized sub-images and outputting an interpolated cumulative density function value obtained for each of said predetermined number of quantized sub-images; and (f) independently performing histogram-equalization for each of said predetermined number of quantized sub-images according to the interpolated cumulative density function value for each of said predetermined number of quantized sub-images.

2. A method for enhancing an image according to claim 1, wherein said step (f) comprises the substeps of:

(f1) mapping samples of a respective one of said predetermined number of quantized sub-images to a gray level according to the interpolated cumulative density function value of the respective one of said predetermined number of quantized sub-images;

(f2) comparing the input image signals with said quantized mean level; and (f3) selecting one of the samples mapped to the gray level for each of said predetermined number of quantized sub-images according to the result of the comparison in said step (f2).

3. A method for enhancing an image according to claim 1, wherein in said step (c) said input quantized image signals are split into two quantized sub-images according to the quantized mean level.

4. A method for enhancing an image according to claim 1, wherein in said step (e) said interpolation is linear.

5. A method for enhancing the image of histogram-equalizing image signals represented as a predetermined number of gray levels, said method comprising the steps of:

(a) quantizing levels of input image signals and outputting quantized input image signals;

(b) calculating a gray level distribution of the quantized input image signals by a unit of a picture;

(c) quantizing the mean of the input image signals by the unit of a picture and outputting a quantized mean level;

(d) splitting the gray level distribution into a predetermined number of quantized sub-images according to the quantized mean level;

(e) obtaining a cumulative density function value for each of the quantized sub-images in said step (d) according to the gray level distribution;

(f) interpolating the cumulative density function value of each of the quantized sub-images based on the input image signals and the cumulative density function value obtained for each of the quantized sub-images and outputting an interpolated cumulative density function value for each of the quantized sub-images; and (g) independently performing histogram-equalization for each of the quantized sub-images according to the interpolated cumulative density function value of each of the quantized sub-images and outputting an enhanced signal.

6. A method for enhancing an image according to claim 5, wherein said step (g) comprises the substeps of:

(g1) mapping samples of a respective one of the quantized sub-images to a gray level according to the interpolated cumulated density function value for each of the quantized sub-images;

(g2) comparing the input image signals with said quantized mean level; and (g3) selecting one of the samples mapped to the gray level for each of the quantized sub-images according to the result of the comparison in said step (g2).

7. A method for enhancing an image according to claim 5, wherein in said step (d) said gray level distribution is split into two quantized sub-images according to the quantized mean level.

8. A method for enhancing an image according to claim 5, wherein in said step (e) said interpolation is linear.

9. A circuit for enhancing an image of histogram-equalizing image signals represented as a predetermined number of gray levels, said circuit comprising:

first quantizing means for quantizing levels of input image signals and outputting quantized input image signals;

first calculating means for calculating a gray level distribution of the quantized input image signals by a unit of a picture;

second calculating means for calculating the mean level of input image signals by the unit of a picture;

second quantizing means for quantizing the mean level and outputting a quantized mean level;

third calculating means for calculating a cumulative density function value for each quantized sub-image by splitting the gray level distribution calculated in said first calculating means into a predetermined number of quantized sub-images according to the quantized mean level;

interpolating means for interpolating the cumulative density function value of each quantized sub-image based on the input image signals and the cumulative density function value for each quantized sub-image and outputting interpolated cumulative density function value for each quantized sub-image;

mapping means for mapping the sample of each quantized sub-image to a gray level based on the interpolated cumulative density function value for each quantized sub-image; and outputting means for outputting one of the samples mapped to the gray level for each quantized sub-image according to a comparison result of the quantized mean level and input image signals.

10. A circuit for enhancing an image according to claim 9, wherein said outputting means comprises:

a comparator for comparing said quantized mean level with said input image signals and outputting a selecting control signal; and a selector for selecting one of the samples mapped to the gray level for each quantized sub-image according to the selecting control signal.

11. A circuit for enhancing an image according to claim 9, wherein said third calculating means comprises a buffer for updating the cumulative density function value for each quantized sub-image by the unit of a picture and providing a prestored cumulative density function value to said interpolating means during updating.

12. A circuit for enhancing an image according to claim 9, further comprising a picture memory for delaying said input image signals by the unit of one picture so as to input to said interpolating means image signals of the same picture where said cumulative density function value is calculated in said third calculating means.

13. A circuit for enhancing an image according to claim 9, wherein said picture unit is a frame and said predetermined number of quantized sub-images is 2.

14. A circuit for enhancing an image according to claim 9, wherein said interpolating performed by said interpolating means is a linear interpolation.

* * * * *